(12) United States Patent
Kim et al.

(10) Patent No.: US 9,784,343 B1
(45) Date of Patent: Oct. 10, 2017

(54) PLANETARY GEAR TRAIN OF AUTOMATIC TRANSMISSION FOR A VEHICLE

(71) Applicant: HYUNDAI MOTOR COMPANY, Seoul (KR)

(72) Inventors: Jin Ho Kim, Suwon-si (KR); Jinseok Kim, Seoul (KR); Jae Chang Kook, Hwaseong-si (KR); Dong Hwan Hwang, Seoul (KR); Seong Wook Hwang, Gunpo-si (KR); Woo Jin Chang, Suwon-si (KR); Tae Whan Kim, Yongin-si (KR); Seongwook Ji, Gunpo-si (KR); Chon Ok Kim, Yongin-si (KR); Wonmin Cho, Hwaseong-si (KR); Hyun Sik Kwon, Seoul (KR); Jong Sool Park, Hwaseong-si (KR); Kyeong Hun Lee, Seoul (KR); Jong Soo Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/371,124

(22) Filed: Dec. 6, 2016

(30) Foreign Application Priority Data

Sep. 29, 2016 (KR) .......................... 10-2016-0125559

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS

| 2010/0240489 A1* | 9/2010 | Carey | F16H 3/66 475/276 |
|---|---|---|---|
| 2016/0356354 A1* | 12/2016 | Kook | F16H 3/66 |
| 2017/0030433 A1* | 2/2017 | Takagi | F16H 3/66 |

* cited by examiner

*Primary Examiner* — Justin Holmes
(74) *Attorney, Agent, or Firm* — Knobbe Martens Olson & Bear LLP

(57) ABSTRACT

A an automatic transmission includes: a first planetary gear set including a first, second, and third rotation elements; a second planetary gear set including a fourth, fifth, and sixth rotation elements; a third planetary gear set including a seventh, eighth, and ninth rotation elements; a fourth planetary gear set including a tenth, eleventh and twelfth rotation elements; a first shaft interconnecting the first and fourth rotational elements, and selectively connected to the transmission housing; a second shaft interconnecting the second and seven rotational elements, and connected with an input shaft; a third shaft connected to the third rotational element, and selectively connected to the transmission housing; a fourth shaft connected to the fifth rotational element; a fifth shaft interconnecting the sixth and eleventh rotational elements, and selectively connected to the transmission housing; and a sixth shaft interconnecting the eighth and twelfth rotational element, and connected to an output shaft.

10 Claims, 2 Drawing Sheets

FIG. 2

| Shift-stage | Control element |  |  |  |  |  |  | Gear ratio | Step ratio | Remark |
|---|---|---|---|---|---|---|---|---|---|---|
|  | C1 | C2 | C3 | C4 | B1 | B2 | B3 |  |  |  |
| D1 | ● |  | ● |  |  | ● |  | 4.722 | – |  |
| D2 |  |  | ● |  | ● | ● |  | 2.87 | 1.645 |  |
| D3 | ● |  | ● |  | ● |  |  | 1.912 | 1.501 |  |
| D4 | ● | ● |  |  | ● |  |  | 1.458 | 1.311 |  |
| D5 |  | ● |  | ● | ● |  |  | 1.177 | 1.239 | Gear ratio span : 10.42 |
| D6 | ● | ● |  | ● |  |  |  | 1 | 1.177 |  |
| D7 |  | ● |  | ● |  |  | ● | 0.783 | 1.277 |  |
| D8 | ● |  |  |  |  |  | ● | 0.632 | 1.239 |  |
| D9 | ● |  | ● |  |  |  | ● | 0.531 | 1.190 |  |
| D10 |  | ● | ● |  |  |  | ● | 0.453 | 1.172 |  |
| REV |  |  |  | ● |  | ● | ● | -3.361 | – | Ratio of REV vs D1 |

PLANETARY GEAR TRAIN OF AUTOMATIC TRANSMISSION FOR A VEHICLE

CROSS-REFERENCE TO RELATED APPLICATION

This application claims priority to and the benefit of Korean Patent Application No. 10-2016-0125559 filed in the Korean Intellectual Property Office on Sep. 29, 2016, the entire contents of which are incorporated herein by reference.

BACKGROUND (a) Field

The present disclosure relates to an automatic transmission for a vehicle. More particularly, the present disclosure relates to a planetary gear train of an automatic transmission for a vehicle.

(b) Description of the Related Art

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

The disclosure of this section is to provide background of the invention. Applicant notes that this section may contain information available before this application. However, by providing this section, Applicant does not admit that any information contained in this section constitutes prior art.

SUMMARY

One aspect of the present invention provides a planetary gear train of an automatic transmission for a vehicle having advantages of, by minimal complexity, realizing at least forward tenth speeds and at least one reverse speed, increasing a gear ratio span so as to improve power delivery performance and fuel consumption, and achieving linearity of shift stage step ratios.

A planetary gear train according to an embodiment of the present invention includes an input shaft for receiving an engine torque; an output shaft outputting changed torque; a first planetary gear set including a first, second, and third rotation elements; a second planetary gear set including a fourth, fifth, and sixth rotation elements; a third planetary gear set including a seventh, eighth, and ninth rotation elements; a fourth planetary gear set including a tenth, eleventh and twelfth rotation elements; a first shaft connected with the first rotational element and the fourth rotational, and selectively connected to a transmission housing; a second shaft interconnecting the second rotational element and the seventh rotational element, and connected with the input shaft; a third shaft connected to the third rotational element and selectively connected to the transmission housing; a fourth shaft connected to the fifth rotational element; a fifth shaft interconnecting the sixth rotational element and the eleventh rotational element, and selectively connected to the transmission housing; and a sixth shaft interconnecting the eighth rotational element and the twelfth rotational element, and connected to the output shaft.

The planetary gear train may further include a seventh shaft connected to the ninth rotational element, and selectively connected to the fourth shaft and the fifth shaft, respectively; and an eighth shaft connected to the tenth rotational element, and selectively connected to the first shaft and the fourth shaft, respectively.

The first, second, and third rotational element of the first planetary gear set are respectively a first sun gear, a first planet carrier, and a first ring gear of the first planetary gear set. The fourth, fifth, and sixth rotational element of the second planetary gear set are respectively a second sun gear, a second planet carrier, and a second ring gear of the second planetary gear set. The seventh, eighth, and ninth rotational elements of the third planetary gear set are respectively a third sun gear, a third planet carrier, and a third ring gear of the third planetary gear set. The tenth, eleventh, and twelfth rotational elements of the fourth planetary gear set are respectively a fourth sun gear, a fourth planet carrier, and a fourth ring gear of the fourth planetary gear set.

The first, second, third, and fourth planetary gear sets may be disposed in a sequence of the third, first, second, and fourth planetary gear sets from an engine side.

The planetary gear train according to an embodiment of the present invention may further include a first clutch selectively connecting the first shaft and the eighth shaft; a second clutch selectively connecting the fifth shaft and the seventh shaft; a third clutch selectively connecting the fourth shaft and the seventh shaft; a fourth clutch selectively connecting the fourth shaft and the eighth shaft; a first brake selectively connecting the first shaft and the transmission housing; a second brake selectively connecting the fifth shaft and the transmission housing; and a third brake selectively connecting the third shaft and the transmission housing.

The planetary gear train according to an embodiment of the present invention may realize at least forward tenth speeds and at least one reverse speed formed by operating the four planetary gear sets as simple planetary gear sets by controlling seven control elements.

In addition, a planetary gear train according to an embodiment of the present invention may realize a gear ratio span of more than 10.0, thereby maximizing efficiency of driving an engine.

In addition, the linearity of step ratios of shift stages is secured while multi-staging the shift stage with high efficiency, securing linearity of step ratios of shift stages, thereby making it possible to improve drivability such as acceleration before and after a shift, an engine speed rhythmic sense, and the like.

Further, effects that can be obtained or expected from embodiments of the present invention are directly or suggestively described in the following detailed description. That is, various effects expected from embodiments of the present invention will be described in the following detailed description.

BRIEF DESCRIPTION OF THE DRAWINGS

FIG. 2 is an operational chart for respective control elements at respective shift stages in a planetary gear train according to an embodiment of the present invention.

DETAILED DESCRIPTION OF EMBODIMENTS

Figure 1:
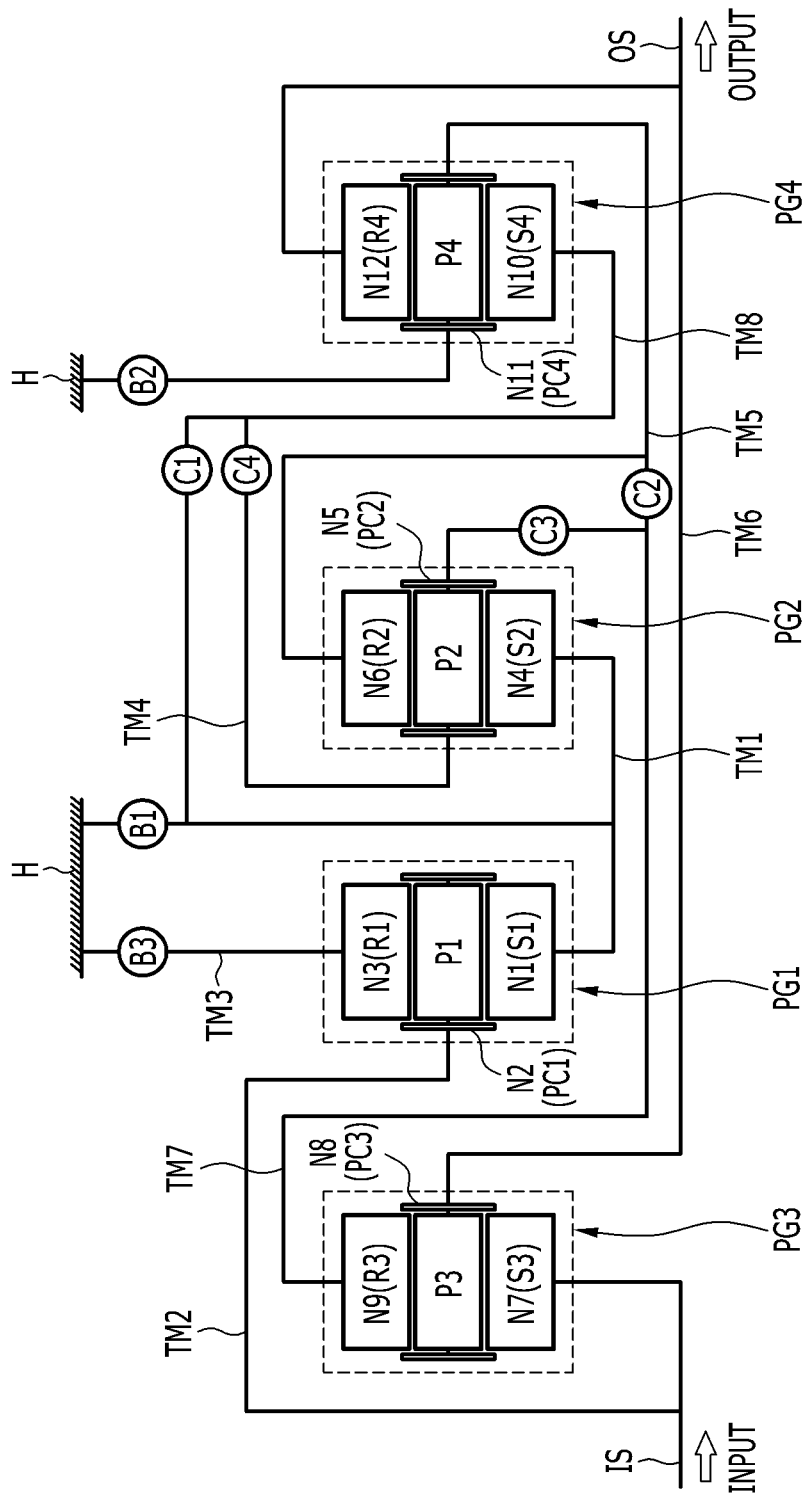
FIG. 1 is a schematic diagram of a planetary gear train according to an embodiment of the present invention.

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

A typical automatic transmission of eight or more shift-stages includes three or four planetary gear sets and five to seven control elements (frictional elements), and may easily become lengthy, thereby deteriorating installability.

In this regard, disposing planetary gear sets in parallel or employing dog clutches instead of wet-type control elements may be attempted. However, such an arrangement may not be widely applicable, and using dog clutches may easily deteriorate shift-feel.

Considering that gear ratio spans of recently developed eight-speed automatic transmissions are typically between 6.5 and 7.5, fuel consumption enhancement is not very large. In the case of a gear ratio span of an eight-speed automatic transmission having a level above 9.0, it is difficult to maintain step ratios between adjacent shift stages to be linear, by which driving efficiency of an engine and drivability of a vehicle deteriorated.

Embodiments are further discussed below. FIG. 1 is a schematic diagram of a planetary gear train according to an embodiment of the present invention.

Referring to FIG. 1, a planetary gear train according to an embodiment of the present invention includes first, second, third, and fourth planetary gear set PG1, PG2, PG3, and PG4, arranged on a same axis, an input shaft IS, an output shaft OS, eight shafts TM1 to TM8 interconnecting rotational elements of the first, second, third, and fourth planetary gear set PG1, PG2, PG3, and PG4, four clutches C1 to C4 and two brakes B1 and B2 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of third, first, second, and fourth planetary gear sets PG3, PG1, PG2, and PG4, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus.

The first planetary gear set PG1 is a single pinion planetary gear set, and includes a first planet carrier PC1 that supports first pinion gear P1 externally engaged with the first sun gear S1, and a first ring gear R1 that is internally engaged with the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second planet carrier PC2 that supports second pinion gear P2 externally engaged with the second sun gear S2, and a second ring gear R2 that is internally engaged with the second pinion gear P2. The second sun gear S2 acts as a fourth rotational element N4, the second planet carrier PC2 acts as a fifth rotational element N4, and the second ring gear R2 acts as a sixth rotational element N6.

The third planetary gear set PG3 is a single pinion planetary gear set, and includes a third planet carrier PC3 that supports third pinion gear P3 externally engaged with the third sun gear S3, and a third ring gear R3 that is internally engaged with the third pinion gear P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth planet carrier PC4 that supports fourth pinion gear P4 externally engaged with the fourth sun gear S4, and a fourth ring gear R4 that is internally engaged with the fourth pinion gear P4. The fourth sun gear S4 acts as a tenth rotational element N10, the fourth planet carrier PC4 acts as a eleventh rotational element N11, and the fourth ring gear R4 acts as a twelfth rotational element N12.

In the first, second, third, and fourth planetary gear sets PG1, PG2, PG3, and PG4, the first rotational element N1 is directly connected with the fourth rotational element N4, the second rotational element N2 is directly connected with the seventh rotational element N7, the sixth rotational element N6 is directly connected with the eleventh rotational element N11, and the eighth rotational element N8 is directly connected with the twelfth rotational element N12, by eight shafts TM1 to TM8.

The eight shafts TM1 to TM8 are hereinafter described in detail.

In embodiments, each of the eight shafts TM1 to TM8 may be a rotational member that directly interconnects the input and output shafts and rotational elements of the planetary gear sets PG1, PG2, PG3, and PG4, or may be a fixed member fixed to the transmission housing H.

The first shaft TM1 may connect the first rotational element N1 (the first sun gear S1) and the fourth rotational element N4 (the fourth sun gear S4), and is selectively connected to the transmission housing H, thereby selectively acting as a fixed element.

The second shaft TM2 may connect the second rotational element N2 (the first planet carrier PC1) and the seventh rotational element N7 (the third sun gear S3), and is directly connected with the input shaft IS, thereby always acting as an input element. The third shaft TM3 may be connected to the third rotational element N3 (the first ring gear R1), and selectively connected to the transmission housing H, thereby acting as a selective fixed element.

The fourth shaft TM4 may be connected to the fifth rotational element N5 (the second planet carrier PC2).

The fifth shaft TM5 may connect the sixth rotational element N6 (the second ring gear R2) and the eleventh rotational element N11 (the fourth planet carrier PC4), and selectively connected to the transmission housing H, thereby acting as a selective fixed element.

The sixth shaft may connect the eighth rotational element N8 (the third planet carrier PC3) and the twelfth rotational element N12 (the fourth ring gear R4), and is directly connected to the output shaft OS, thereby always acting as an output element.

The seventh shaft TM7 may be connected to the ninth rotational element N9 (the third ring gear R3), and is selectively connected to the fourth shaft TM4 and the fifth shaft TM5, respectively.

The eighth shaft TM8 may be connected to the tenth rotational element N10 (the fourth sun gear S4), and is selectively connected to the first shaft TM1 and the fourth shaft TM4, respectively.

The eight shafts TM1 to TM8, the input shaft IS, and the output shaft OS may be selectively interconnected with one another by control elements of four clutches C1, C2, C3, and C4.

The eight shafts TM1 to TM8 may be selectively connected with the transmission housing H, by control elements of three brakes B1, B2, and B3. When connected to the housing H, the connected shaft does not rotate, and the gear or carrier connected to the connected shaft is stationary.

The four clutches C1 to C4 and the three brakes B1 to B3 are arranged as follows.

The first clutch C1 is arranged between the first shaft TM1 and the eighth shaft TM8, and selectively connects the first shaft TM1 and the eighth shaft TM8, thereby delivering power therebetween.

The second clutch C2 is arranged between the fifth shaft TM5 and the seventh shaft TM7, and selectively connects the fifth shaft TM5 and the seventh shaft TM7, thereby controlling power delivery therebetween.

The third clutch C3 is arranged between the fourth shaft TM4 and the seventh shaft TM7, and selectively connects the fourth shaft TM4 and the seventh shaft TM7, thereby controlling power delivery therebetween.

The fourth clutch C4 is arranged between the fourth shaft TM4 and the eighth shaft TM8, and selectively connects the fourth shaft TM4 and the eighth shaft TM8, thereby controlling power delivery therebetween The first brake B1 is arranged between the first shaft TM1 and the transmission housing H, and selectively connects the first shaft TM1 to the transmission housing H.

The second brake B2 is arranged between the fifth shaft TM5 and the transmission housing H, and selectively connects the fifth shaft TM5 to the transmission housing H.

The third brake B3 is arranged between the third shaft TM3 and the transmission housing H, and selectively connects the third shaft TM3 to the transmission housing H.

The respective control elements of the first, second, third, and fourth clutches C1, C2, C3, and C4 and the first, second, and third brakes B1, B2, and B3 may be realized as multi-plate hydraulic pressure friction devices that are frictionally engaged by hydraulic pressure.

FIG. 2 is an operational chart for respective control elements at respective shift stages in a planetary gear train according to an embodiment of the present invention.

Referring to FIG. 2, a planetary gear train according to an embodiment of the present invention realizes ten forward speeds and one reverse speed by operating three control elements among the first, second, third, and fourth clutches C1, C2, C3, and C4 and the first, second, and third brakes B1, B2, and B3 at respective shift-stages.

In the forward first speed shift-stage D1, the first and third clutches C1 and C3 and the second brake B2 are simultaneously operated.

As a result, the first shaft TM1 is connected with the eighth shaft TM8 by operation of the first clutch C1, and the fourth shaft TM4 is connected with the seventh shaft TM7 by operation of the third clutch C3. In this state, the torque of the input shaft IS is input to the second shaft TM2.

In addition, the fifth shaft TM5 acts as a fixed element by the operation of the second brake B2, thereby realizing the forward first speed by cooperative operation of respective shafts and outputting a shifted torque to the output shaft OS connected with the sixth shaft TM6.

In embodiments, in the forward first speed shift-stage, by the connections between the shafts and the operation of clutches and brakes as discussed above, the input shaft IS, the first planet carrier PC1 and the third sun gear S3 rotate at the same speed. Further, the first sun gear S1, the second sun gear S2 and the fourth sun gear S4 rotate at the same speed. The third ring gear R3 and the second planet carrier PC2 rotate at the same speed. The fourth planet carrier PC4 and the second ring gear R2 are stationary. Also, the third planet carrier PC3, the fourth ring gear R4 and the output shaft OS rotate at the same speed.

In the forward second speed shift-stage D2, the third clutch C3, the first and second brakes B1, B2 are simultaneously operated.

As a result, the fourth shaft TM4 is connected with the seventh shaft TM7 by operation of the third clutch C3. In this state, the torque of the input shaft IS is input to the second shaft TM2.

In addition, the first and fifth shaft TM1, TM5 act as the fixed elements by the operation of the first and second brakes B1, B2, thereby realizing the forward second speed by cooperative operation of respective shafts and outputting a shifted torque to the output shaft OS connected with the sixth shaft TM6.

In embodiments, in the forward second speed shift-stage, by the connections between the shafts and the operation of clutches and brakes as discussed above, the input shaft IS, the first planet carrier PC1 and the third sun gear S3 rotate at the same speed. Further, the first sun gear S1 and the second sun gear S2 are stationary. The fourth planet carrier PC4 and the second ring gear R2 are stationary. Also, the third planet carrier PC3, the fourth ring gear R4 and the output shaft OS rotate at the same speed.

In the forward third speed shift-stage D3, the first and third clutches C1, C3 and the first brakes B1 are simultaneously operated.

As a result, the first shaft TM1 is connected with the eighth shaft TM8 by operation of the first clutch C1, and the fourth shaft TM4 is connected with the seventh shaft TM7 by operation of the third clutch C3. In this state, the torque of the input shaft IS is input to the second shaft TM2.

In addition, the first shaft TM1 acts as the fixed element by the operation of the first brakes B1, thereby realizing the forward third speed by cooperative operation of respective shafts and outputting a shifted torque to the output shaft OS connected with the sixth shaft TM6.

In embodiments, in the forward third speed shift-stage, by the connections between the shafts and the operation of clutches and brakes as discussed above, the input shaft IS, the first planet carrier PC1 and the third sun gear S3 rotate at the same speed. Further, the first sun gear S1, the second sun gear S2 and the fourth sun gear S4 are stationary. Also, the third planet carrier PC3, the fourth ring gear R4 and the output shaft OS rotate at the same speed.

In the forward fourth speed shift-stage D4, the first and second clutches C1 and C2 and the first brake B1 are simultaneously operated.

As a result, the first shaft TM1 is connected with the eighth shaft TM8 by operation of the first clutch C1, and the fifth shaft TM5 is connected with the seventh shaft TM7 by the operation of the second clutch C2. In this state, the torque of the input shaft IS is input to the second shaft TM2.

In addition, the first shaft TM1 acts as the fixed element by the operation of the first brake B1, thereby realizing the forward fourth speed by cooperative operation of respective shafts and outputting a shifted torque to the output shaft OS connected with the sixth shaft TM6.

In embodiments, in the forward fourth speed shift-stage, by the connections between the shafts and the operation of clutches and brakes as discussed above, the input shaft IS, the first planet carrier PC1 and the third sun gear S3 rotate at the same speed. Further, the first sun gear S1, the second sun gear S2 and the fourth sun gear S4 are stationary. The fourth planet carrier PC4 and the third ring gear R3 rotate at the same speed. Also, the third planet carrier PC3, the fourth ring gear R4 and the output shaft OS rotate at the same speed.

In the forward fifth speed shift-stage D5, the second and fourth clutches C2 and C4 and the first brake B1 are simultaneously operated.

As a result, the fifth shaft TM5 is connected with the seventh shaft TM7 by operation of the second clutch C2, and the fourth shaft TM4 is connected with the eighth shaft TM8 by the operation of the fourth clutch C4. In this state, the torque of the input shaft IS is input to the second shaft TM2.

In addition, the first shaft TM1 acts as a fixed element by the operation of the first brake B1, thereby realizing the forward fifth speed by cooperative operation of respective shafts and outputting a shifted torque to the output shaft OS connected with the sixth shaft TM6.

In embodiments, in the forward fifth speed shift-stage, by the connections between the shafts and the operation of clutches and brakes as discussed above, the input shaft IS, the first planet carrier PC1 and the third sun gear S3 rotate at the same speed. Further, the first sun gear S1 and the second sun gear S2 are stationary. The second ring gear R2 and the third ring gear R3 rotate at the same speed. Also, the third planet carrier PC3, the fourth ring gear R4 and the output shaft OS rotate at the same speed.

In the forward sixth speed shift-stage D6, the first, second, and fourth clutches C1, C2 and C4 are simultaneously operated.

As a result, the first shaft TM1 is connected with the eighth shaft TM8 by operation of the first clutch C1, the fifth shaft TM5 is connected with the seventh shaft TM7 by operation of the second clutch C2, and the fourth shaft TM4 is connected with the eighth shaft TM8 by the operation of the fourth clutch C4. In this state, the torque of the input shaft IS is input to the second shaft TM2.

In this case, entire planetary gear sets PG1, PG2, PG3, and PG4 integrally rotate, and a torque is outputted as inputted, thereby forming the forward sixth speed and outputting the inputted torque to the output shaft OS connected with the sixth shaft TM6.

In embodiments, in the forward sixth speed shift-stage, by the connections between the shafts and the operation of clutches and brakes as discussed above, the input shaft IS, the first planet carrier PC1 and the third sun gear S3 rotate at the same speed. Further, the first sun gear S1, the second sun gear S2, the second planet carrier PC2 and the fourth sun gear S4 rotate at the same speed. The second ring gear R2, the fourth planet carrier PC4 and the third ring gear R3 rotate at the same speed. Also, the third planet carrier PC3, the fourth ring gear R4 and the output shaft OS rotate at the same speed.

In the forward seventh speed shift-stage D7, the second and fourth clutches C2 and C4, and the third brake B3 are simultaneously operated.

As a result, the fifth shaft TM5 is connected with the seventh shaft TM7 by operation of the second clutch C2, and the fourth shaft TM4 is connected with the eighth shaft TM8 by the operation of the fourth clutch C4. In this state, the torque of the input shaft IS is input to the second shaft TM2.

In addition, the third shaft TM3 acts as a fixed element by the operation of the third brake B3, thereby realizing the forward seventh speed by cooperative operation of respective shafts and outputting a shifted torque to the output shaft OS connected with the sixth shaft TM6.

In embodiments, in the forward seventh speed shift-stage, by the connections between the shafts and the operation of clutches and brakes as discussed above, the input shaft IS, the first planet carrier PC1 and the third sun gear S3 rotate at the same speed. Further, the first sun gear S1 and the second sun gear S2 rotate at the same speed. The first ring gear R1 is stationary. The second ring gear R2, the fourth planet carrier PC4 and the third ring gear R3 rotate at the same speed. Also, the third planet carrier PC3, the fourth ring gear R4 and the output shaft OS rotate at the same speed.

In the forward eighth speed shift-stage D8, the first and second clutches C1 and C2 and the third brake B3 are simultaneously operated.

As a result, the first shaft TM1 is connected with the eighth shaft TM8 by operation of the first clutch C1, and the fifth shaft TM5 is connected with the seventh shaft TM7 by the operation of the second clutch C2. In this state, the torque of the input shaft IS is input to the second shaft TM2.

In addition, the third shaft TM3 acts as a fixed element by the operation of the third brake B3, thereby realizing the forward eighth speed by cooperative operation of respective shafts and outputting a shifted torque to the output shaft OS connected with the sixth shaft TM6.

In embodiments, in the forward eighth speed shift-stage, by the connections between the shafts and the operation of clutches and brakes as discussed above, the input shaft IS, the first planet carrier PC1 and the third sun gear S3 rotate at the same speed. Further, the first sun gear S1, the second sun gear S2 and the fourth sun gear S4 rotate at the same speed. The first ring gear R1 is stationary. Also, the third planet carrier PC3, the fourth ring gear R4 and the output shaft OS rotate at the same speed.

In the forward ninth speed shift-stage D9, the first and third clutches C1 and C3 and the third brake B3 are simultaneously operated.

As a result, the first shaft TM1 is connected with the eighth shaft TM8 by operation of the first clutch C1, and the fourth shaft TM4 is connected with the seventh shaft TM7 by operation of the third clutch C2. In this state, the torque of the input shaft IS is input to the second shaft TM2.

In addition, the third shaft TM3 acts as a fixed element by the operation of the third brake B3, thereby realizing the forward ninth speed by cooperative operation of respective shafts and outputting a shifted torque to the output shaft OS connected with the sixth shaft TM6.

In embodiments, in the forward ninth speed shift-stage, by the connections between the shafts and the operation of clutches and brakes as discussed above, the input shaft IS, the first planet carrier PC1 and the third sun gear S3 rotate at the same speed. Further, the first sun gear S1, the second sun gear S2, and the fourth sun gear S4 rotate at the same speed. The first ring gear R1 is stationary. The second planet carrier PC2 and the third ring gear R3 rotate at the same speed. Also, the third planet carrier PC3, the fourth ring gear R4 and the output shaft OS rotate at the same speed.

In the forward tenth speed shift-stage D10, the second and third clutches C2 and C3 and the third brake B3 are simultaneously operated.

As a result, the fifth shaft TM5 is connected with the seventh shaft TM7 by operation of the second clutch C2, and the fourth shaft TM4 is connected with the seventh shaft TM7 by operation of the third clutch C3. In this state, the torque of the input shaft IS is input to the second shaft TM2.

In addition, the third shaft TM3 acts as a fixed element by the operation of the third brake B3, thereby realizing the forward tenth speed by cooperative operation of respective shafts and outputting a shifted torque to the output shaft OS connected with the sixth shaft TM6.

In embodiments, in the forward tenth speed shift-stage, by the connections between the shafts and the operation of clutches and brakes as discussed above, the input shaft IS, the first planet carrier PC1 and the third sun gear S3 rotate at the same speed. Further, the first sun gear S1 and the second sun gear S2 rotate at the same speed. The first ring gear R1 is stationary. The second planet carrier PC2, the fourth planet carrier PC4 and the third ring gear R3 rotate at the same speed. Also, the third planet carrier PC3, the fourth ring gear R4 and the output shaft OS rotate at the same speed.

In the reverse speed REV, the fourth clutch C4, and the second and third brakes B1 and B3 are simultaneously operated.

As a result, the fourth shaft TM4 is connected with the eighth shaft TM8 by operation of the fourth clutch C4. In this state, the torque of the input shaft IS is input to the second shaft TM2.

In addition, the fifth and third shafts TM5 and TM3 act as the fixed elements by the operation of the second and third brakes B2 and B3, realizing the reverse speed by cooperative operation of respective shafts and outputting a reverse torque to the output shaft OS connected with the sixth shaft TM6.

In embodiments, in the reverse speed stage, by the connections between the shafts and the operation of clutches and brakes as discussed above, the input shaft IS, the first planet carrier PC1 and the third sun gear S3 rotate at the same speed. Further, the first sun gear S1 and the second sun gear S2 rotate at the same speed. The first ring gear R1 is stationary. The second planet carrier PC2 and the fourth sun gear S4 rotate at the same speed. The fourth planet carrier PC4 and the second ring gear R2 are stationary. Also, the third planet carrier PC3, the fourth ring gear R4 and the output shaft OS rotate at the same speed.

In embodiments, the third sun gear S3, the planet carrier PC3 and the third ring gear R3 of the third gear sets PG3 are not stationary in every speed stage by operation of the clutches. In embodiments, the sun gears of the planetary gear sets PG1, PG2, PG3, and PG4 have the same size and the same number of teeth, the planet gears of the planetary gear sets PG1, PG2, PG3, and PG4 have the same size and the same number of teeth and the ring gears of the planetary gear sets PG1, PG2, PG3, and PG4 have the same size and the same number of teeth, but the invention is not limited thereto.

As described above, a planetary gear train according to an embodiment of the present invention may realize at least ten forward speeds and at least one reverse speed by operating four planetary gear sets PG1, PG2, PG3, and PG4 by controlling the four clutches C1, C2, C3, and C4 and the three brakes B1, B2, and B3.

In addition, a planetary gear train according to an embodiment of the present invention may realize a gear ratio span of more than 10.0, thereby maximizing efficiency of driving an engine.

In addition, the linearity of step ratios of shift stages is secured while multi-staging the shift stage with high efficiency, securing linearity of step ratios of shift stages, thereby making it possible to improve drivability such as acceleration before and after a shift, an engine speed rhythmic sense, and the like.

While embodiments of this invention have been described in connection with, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, comprising:
   an input shaft connected to an engine for receiving engine torque;
   an output shaft for outputting changed torque;
   a first planetary gear set including a first, second, and third rotation elements;
   a second planetary gear set including a fourth, fifth, and sixth rotation elements;
   a third planetary gear set including a seventh, eighth, and ninth rotation elements;
   a fourth planetary gear set including a tenth, eleventh and twelfth rotation elements;
   a first shaft interconnecting the first rotational element and the fourth rotational element, and selectively connected to the transmission housing;
   a second shaft interconnecting the second rotational element and the seven rotational element, and connected with the input shaft;
   a third shaft connected to the third rotational element, and selectively connected to the transmission housing;
   a fourth shaft connected to the fifth rotational element;
   a fifth shaft interconnecting the sixth rotational element and the eleventh rotational element, and selectively connected to the transmission housing; and
   a sixth shaft interconnecting the eighth rotational element and the twelfth rotational element, and connected to the output shaft.

2. The planetary gear train of claim 1, further comprising:
   a seventh shaft connecting to the ninth rotational element, and being selectively connected to the fourth shaft and the fifth shaft; and
   an eighth shaft connected to the tenth rotational element, and selectively connected to the first shaft and the fourth shaft, respectively.

3. The planetary gear train of claim 1, wherein:
the first, second, and third rotational element of the first planetary gear set are respectively a first sun gear, a first planet carrier, and a first ring gear of the first planetary gear set;
the fourth, fifth, and sixth rotational element of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

4. The planetary gear train of claim 1, wherein:
the first, second, third, and fourth planetary gear sets are disposed in a sequence of the third, first, second, and fourth planetary gear sets from an engine side.

5. The planetary gear train of claim 2, further comprising:
a first clutch configured to selectively connect the first shaft and the eighth shaft;
a second clutch configured to selectively connect the fifth shaft and the seventh shaft;
a third clutch configured to selectively connect the fourth shaft and the seven shaft;
a fourth clutch configured to selectively connect the fourth shaft and the eighth shaft;
a first brake configured to selectively connect the first shaft and the transmission housing;
a second brake configured to selectively connect the fifth shaft and the transmission housing; and
a third brake configured to selectively connect the third shaft and the transmission housing.

6. A planetary gear train of an automatic transmission for a vehicle, comprising:
an input shaft connected to an engine for receiving engine torque;
an output shaft for outputting changed torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
Wherein the input shaft is connected with the seventh rotational element;
the output shaft is connected with the twelfth rotational element;
the first rotational element is connected with the fourth rotational element and selectively connected with the tenth rotational element;
the second rotational element is connected with the seventh rotational element;
the fifth rotational element is selectively connected with the ninth rotational element and the tenth rotational element, respectively;
the sixth rotational element is connected with the eleventh rotational element and selectively connected with the ninth rotational element;
the eighth rotational element is connected with the twelfth rotational element.

7. The planetary gear train of claim 6, wherein:
the first rotational element, the third rotational element, and the eleventh rotational element are selectively connected with a transmission housing.

8. The planetary gear train of claim 6, wherein:
the first, second, and third rotational element of the first planetary gear set are respectively a first sun gear, a first planet carrier, and a first ring gear of the first planetary gear set;
the fourth, fifth, and sixth rotational element of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

9. The planetary gear train of claim 6, wherein:
the first, second, third, and fourth planetary gear sets are disposed in a sequence of the third, first, second, and fourth planetary gear sets from an engine side.

10. The planetary gear train of claim 7, further comprising:
a first clutch selectively connecting the first rotational element and the tenth rotational element;
a second clutch selectively connecting the sixth rotational element and the ninth rotational element;
a third clutch selectively connecting the fifth rotational element and the ninth rotational element;
a fourth clutch selectively connecting the fifth rotational element and the tenth rotational element;
a first brake selectively connecting the first rotational element and the transmission housing;
a second brake selectively connecting the eleventh rotational element and the transmission housing; and
a third brake selectively connecting the third rotational element and the transmission housing.

* * * * *